United States Patent
Kim et al.

(10) Patent No.: US 9,678,503 B2
(45) Date of Patent: Jun. 13, 2017

(54) FAIL-OVER SYSTEM AND METHOD FOR A SEMICONDUCTOR EQUIPMENT SERVER

(71) Applicant: SK HYNIX INC., Icheon (KR)

(72) Inventors: Seung Heon Kim, Seongnam (KR); Jong Young Moon, Cheongju (KR)

(73) Assignee: SK HYNIX INC., Icheon (KR)

( * ) Notice: Subject to any disclaimer, the term of this patent is extended or adjusted under 35 U.S.C. 154(b) by 530 days.

(21) Appl. No.: 14/174,788

(22) Filed: Feb. 6, 2014

(65) Prior Publication Data

US 2015/0066185 A1 Mar. 5, 2015

(30) Foreign Application Priority Data

Sep. 5, 2013 (KR) .................. 10-2013-0106729

(51) Int. Cl.
*G05B 19/418* (2006.01)

(52) U.S. Cl.
CPC ............... *G05B 19/4184* (2013.01); *G05B 2219/31355* (2013.01); *G05B 2219/45031* (2013.01); *Y02P 90/14* (2015.11); *Y02P 90/18* (2015.11)

(58) Field of Classification Search
None
See application file for complete search history.

(56) References Cited

U.S. PATENT DOCUMENTS

| | | | | |
|---|---|---|---|---|
| 8,930,539 B1 * | 1/2015 | Rajaa | ................... | G06F 9/4856 709/226 |
| 2001/0056554 A1 * | 12/2001 | Chrabaszcz | ......... | G06F 11/1658 714/13 |
| 2002/0198996 A1 * | 12/2002 | Sreenivasan | ........ | G06F 11/2023 709/226 |
| 2005/0268156 A1 * | 12/2005 | Mashayekhi | ....... | G06F 11/2028 714/4.11 |
| 2007/0083282 A1 * | 4/2007 | Lim | ................... | G05B 23/0291 700/110 |
| 2007/0150581 A1 * | 6/2007 | Banerjee | ................. | H04L 41/22 709/224 |

(Continued)

FOREIGN PATENT DOCUMENTS

KR 10-2001-0069252 A 7/2001
KR 10-1068839 B1 9/2011

*Primary Examiner* — Umat Onat (57) ABSTRACT

A fail-over system and method relates to a fail-over technology of an equipment server managing a semiconductor fabrication equipment server. The fail-over system includes a semiconductor fabrication equipment group including a plurality of semiconductor fabrication equipment and configured to perform semiconductor fabrication processes; an equipment server group including a plurality of equipment servers and configured to control an operation of the semiconductor fabrication equipment group; and a management server configured to detect an error or a faulty operation in at least one equipment server in the equipment server group by communicating with the equipment server group, and execute a fail-over policy for a faulty equipment server in which the faulty operation is detected, wherein executing the fail-over policy includes allocating at least one application running in the faulty equipment server to at least one normal equipment server in which no faulty operation is detected in the equipment server group.

20 Claims, 9 Drawing Sheets

(56) References Cited

U.S. PATENT DOCUMENTS

2007/0220302 A1\* 9/2007 Cline .................. G06F 11/2035
714/4.1
2008/0152342 A1\* 6/2008 Hung ................... H04B 10/032
398/5

\* cited by examiner

FAIL-OVER SYSTEM AND METHOD FOR A SEMICONDUCTOR EQUIPMENT SERVER

CROSS-REFERENCE TO RELATED APPLICATION

The priority of Korean patent application No. 10-2013-0106729 filed on 5 Sep. 2013, the disclosure of which is hereby incorporated by reference in its entirety, is claimed.

BACKGROUND

Embodiments of the present disclosure relate to a fail-over system and method for an equipment server, and more particularly, to a fail-over technology of a server configured to manage semiconductor fabrication equipment.

Typically, a semiconductor device is fabricated by repeatedly performing a series of fabrication steps, such as cleaning, diffusion, photoresist coating, exposure, development, etching, ion implantation, etc., on a wafer. Fabrication equipment for carrying out corresponding fabrication steps is often used.

Semiconductor fabrication equipment for performing the above-mentioned processes is arranged for individual unit processes. About 20 to 25 wafers may constitute a single lot in a corresponding unit process. Thus, a selected unit process can be carried out at an optimal fabrication condition.

The semiconductor fabrication equipment is managed by equipment servers, and individual fabrication processes are carried out under the control of the equipment servers. However, if an error or faulty operation occurs in the equipment servers, the semiconductor fabrication equipment controlled by the equipment server may malfunction or stop operations.

SUMMARY

Various embodiments are directed to providing a fail-over system and method for a semiconductor equipment server, which substantially obviate one or more problems due to limitations of the related art.

An embodiment relates to a fail-over technology of an equipment server configured to manage semiconductor fabrication equipment.

In accordance with an aspect of the embodiment, a fail-over system for a semiconductor equipment server includes: a semiconductor fabrication equipment group including a plurality of semiconductor fabrication equipment and configured to perform semiconductor fabrication processes; an equipment server group including a plurality of equipment servers and configured to control an operation of the semiconductor fabrication equipment group; and a management server configured to detect an error or a faulty operation in at least one equipment server in the equipment server group by communicating with the equipment server group, and execute a fail-over policy for a faulty equipment server in which the faulty operation is detected, wherein executing the fail-over policy includes allocating at least one application running in the faulty equipment server to at least one normal equipment server in which no faulty operation is detected in the equipment server group.

The equipment servers are coupled to a respective one of the plurality of semiconductor fabrication equipment on a one to one basis, or more than two semiconductor fabrication equipment are coupled to a single equipment server.

Each of the equipment servers includes: a communication unit configured to communicate with the management server or the semiconductor fabrication equipment group; a controller configured to control operations of the semiconductor fabrication equipment group; and a storage unit configured to store fabrication control information for the semiconductor fabrication equipment group.

The management server includes: a communication unit configured to communicate with the equipment server group; a controller configured to transmit a test signal to the equipment server group at intervals of a predetermined time, determine whether a response signal is received from the equipment server group within a predetermined period of time to determine whether an error or a faulty operation has occurred in the equipment server group, and execute the fail-over policy for the erroneous equipment server in the equipment server group; and a storage unit configured to store information received from the equipment server group and the fail-over policy.

The controller determines the occurrence of a network failure when response signals are not received from at least a predetermined number of the equipment servers in the equipment server group within a preset period of time.

If a response signal is not received from a first equipment server in the equipment server group, the controller reserves confirmation of a malfunction decision of the first equipment server, determines whether an error or a faulty operation has occurred in other equipment servers in the equipment server group within a first period of time, determines a network failure has occurred when a response signal is not received from a second equipment server in the equipment server group, and executes the fail-over policy for the first equipment server when an error or a faulty operation is not detected from another equipment server in the equipment server group within a second period of time.

After determining the network failure has occurred, if the controller receives a response signal from at least one equipment server in the equipment server group within a third period of time, the controller cancels the decision of the network failure.

The information received from the equipment server group includes at least one of category information of each of applications running in each equipment server of the equipment server group, information regarding the number of the applications, and Central Processing Unit (CPU) occupancy rate information for each of the applications.

The fail-over policy includes a policy for selecting a normal equipment server to back up an erroneous equipment server when an error or a faulty operation occurs in at least one equipment server in the equipment server group and a policy for allocating at least one application running in the erroneous equipment server to the normal equipment server and performing a backup operation for the allocated application.

The controller analyzes Central Processing Unit (CPU) occupancy rates of applications running in a faulty equipment server in the equipment server group, analyzes CPU occupancy rates of normal equipment servers in the equipment server group, and performs a backup operation for each of the applications of the faulty equipment server in an ascending numerical order of the CPU occupancy rates of the normal equipment servers.

An application having the highest CPU occupancy rate from among the applications of the faulty equipment server is allocated to an equipment server having the lowest CPU occupancy rate from among the normal equipment servers.

An application having the second-highest CPU occupancy rate from among the applications of the faulty equipment server is allocated to an equipment server, which has the lowest CPU occupancy rate that is determined after backing up the application having the highest CPU occupancy rate, from among the normal equipment servers.

The communication unit performs data communication using a SEMI Equipment Communication Standard (SECS) protocol or a Transmission Control Protocol/Internet Protocol (TCP/IP).

In accordance with another aspect of the embodiment, a fail-over method for a semiconductor equipment server includes: determining whether an error or a faulty operation has occurred in an equipment server group configured to control semiconductor fabrication processes of a semiconductor fabrication equipment group; and if a faulty equipment server in which the error or faulty operation has occurred is present in the equipment server group, executing a fail-over policy, wherein executing the fail-over policy includes allocating at least one application running in the faulty equipment server to at least one normal equipment server in which no error or faulty operation occurs in the equipment server group.

The determining includes: transmitting a test signal to the equipment server group; determining whether a response signal is received from the equipment server group within a first period of time; and determining an equipment server transmitting no response signal as the faulty equipment server.

The fail-over method further comprises if at least a predetermined number of equipment servers from among a plurality of equipment servers in the equipment server group transmit no response signal within a second period of time, determining a network failure has occurred.

The fail-over method further comprises if a response signal from the equipment server group is received within a third period of time after determining the network failure has occurred, cancelling the decision of the network failure.

Executing the fail-over policy further includes: analyzing a Central Processing Unit (CPU) occupancy rate for each application running in the faulty equipment server; analyzing a CPU occupancy rate of each of normal equipment servers in the equipment server group; and performing a backup operation for each application of the faulty equipment server in an ascending numerical order of the CPU occupancy rates of the normal equipment servers.

Performing the backup operation for each application includes: backing up an application having the highest CPU occupancy rate from among applications of the faulty equipment server onto an equipment server having the lowest CPU occupancy rate from among the normal equipment servers.

Performing the backup operation for each application process includes: backing up an application having the second-highest CPU occupancy rate from among the applications of the faulty equipment server onto an equipment server, which has the lowest CPU occupancy rate that is determined after backing up the application having the highest CPU occupancy rate, from among the normal equipment servers.

It is to be understood that both the foregoing general description and the following detailed description of embodiments are intended to provide further explanation of the invention as claimed.

DESCRIPTION OF EMBODIMENTS

Reference will now be made in detail to certain embodiments, examples of which are illustrated in the accompanying drawings. Wherever possible, the same reference numbers will be used throughout the drawings to refer to the same or like parts. In the following description, a detailed description of related known configurations or functions incorporated herein will be omitted when it may make the subject matter less clear.

A fail-over system and method for a semiconductor equipment server according to embodiments will hereinafter be described with reference to FIGS. 1 to 8.

Figure 1:
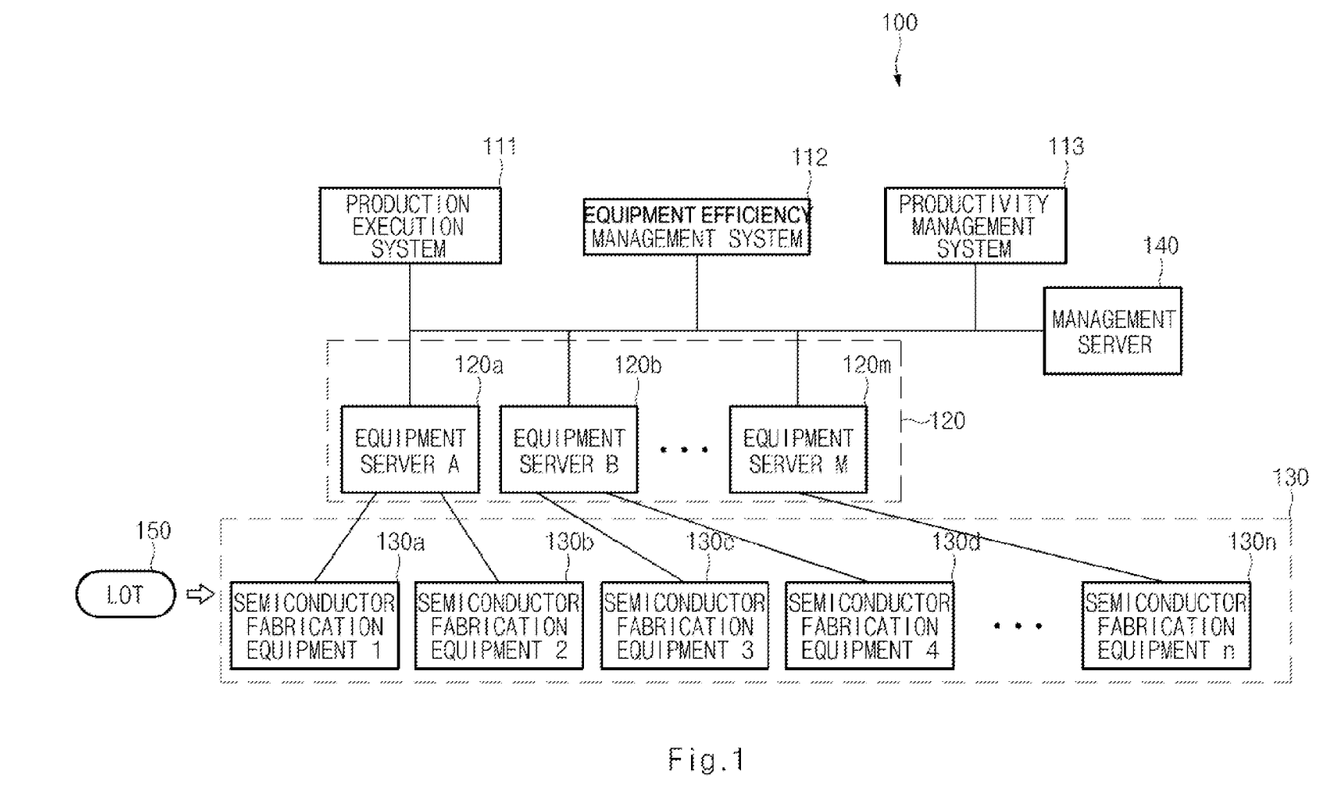
FIG. 1 is a block diagram illustrating a fail-over system for a semiconductor equipment server according to an embodiment.

FIG. 1 is a block diagram illustrating a fail-over system for a semiconductor equipment server according to an embodiment.

Referring to FIG. 1, the semiconductor equipment system 100 includes a production execution system 111, an equipment efficiency management system 112, a productivity management system 113, a management server 140, a semiconductor fabrication equipment group 130, and an equipment server group 120 coupled to the semiconductor fabrication equipment group 130 through online communication. The execution system 111, the equipment efficiency management system 112, the productivity management system 113, and the management server 140 are coupled to the equipment server group 120 and communicate with the equipment server group 120 through online communication.

The semiconductor fabrication equipment group 130 includes a plurality of semiconductor fabrication equipments 130a, 130b, . . . , and 130n (n being a positive integer) that are configured to perform individual unit processes such as a deposition process, a photolithography process, an etching process, an ion implantation process, various thermal annealing (TA) processes, etc. to fabricate a semiconductor device. A lot 150 processed by previous fabrication processes is loaded into the semiconductor fabrication equipment group 130, which performs such subsequent semiconductor fabrication processes on a plurality of semiconductor wafers in the lot 150.

The equipment server group 120 controls the semiconductor fabrication equipment group 130, causing the semiconductor fabrication equipment group 130 to perform semiconductor fabrication processes. The equipment server group 120 includes a plurality of equipment servers 120a, 120b, . . . , and 120m (m being a positive integer). The equipment servers 120a, 120b, . . . , and 120m may store fabrication control information for controlling the semiconductor fabrication equipment group 130 to perform the semiconductor fabrication processes. The equipment servers 120a~120m are coupled to the semiconductor fabrication equipment 130a~130n. The individual equipment servers 120a~120m may be coupled to the semiconductor fabrication equipment 130a~130n on a one to one basis, or more than one of the semiconductor fabrication equipment 130a~130n may be coupled to each of the equipment servers 120a~120m.

Figure 2:
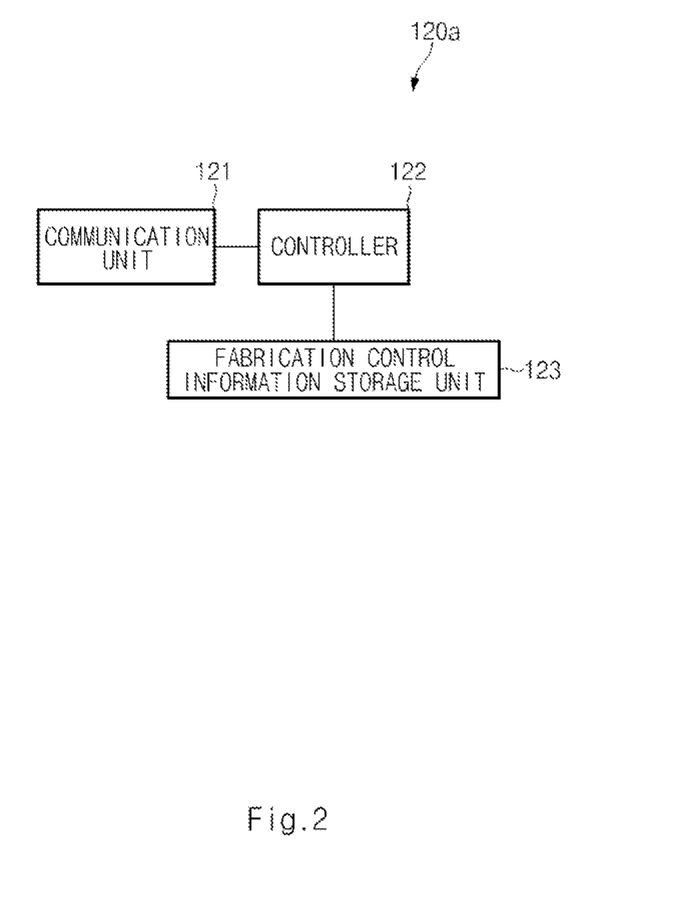
FIG. 2 is a detailed block diagram illustrating an equipment server shown in FIG. 1 according to an embodiment.

FIG. 2 shows an equipment server 120a of the equipment server group 120 according to an embodiment. The equipment server group 120 performs transmission of data and control signals among the semiconductor fabrication equipment group 130, the production execution system 111, the equipment efficiency management system 112, and the productivity management system 113. For this purpose, each of the equipment servers 120a~120m includes a communication unit 121, a controller 122, and a fabrication control information storage unit 123 as shown in FIG. 2.

In an embodiment, the communication unit 121 performs data communication using a general or a specific communication protocol. For example, in an embodiment, the communication unit 121 performs data communication using a Semiconductor Equipment and Materials International (SEMI) Equipment Communications Standard (SECS) protocol, which is based on a communication protocol of the semiconductor equipment, or a Transmission Control Protocol/Internet Protocol (TCP/IP), which is a general communication protocol. That is, the semiconductor fabrication equipment group 130 and the equipment server group 120 communicate with each other using the SECS protocol or TCP/IP, such that data may be shared or exchanged by the semiconductor fabrication equipment group 130 and the equipment server group 120. In this way, the semiconductor equipment 130a~130n and the equipment servers 120a~120m implement bidirectional communication (i.e., two-way communication) therebetween.

In addition, the equipment server group 120 communicates with the production execution system 111, the equipment efficiency management system 112, the productivity management system 113, and the management server 140 using a general communication protocol such as TCP/IP. Thus, data can be transmitted among the equipment server group 120, the production execution system 111, the equipment efficiency management system 112, the productivity management system 113, and the management server 140.

The controller 122 controls the semiconductor fabrication equipment group 130, causing the semiconductor fabrication equipment group 130 to carry out semiconductor fabrication processes. The controller 122 also communicates with the production execution system 111, the equipment efficiency management system 112, and the productivity management system 113 to transmit data and/or control signals.

The fabrication control information storage unit 123 stores fabrication control information to control the semiconductor fabrication processes that are performed by the semiconductor fabrication equipment group 130. The fabrication control information may include a fabrication order, and a set of fabrication conditions, i.e., a fabrication recipe, for the semiconductor fabrication equipment 130a~130n, which are used for controlling the semiconductor fabrication processes. As a result, each piece of semiconductor fabrication equipment 130a~130n installed on a semiconductor production line can optimally carry out their semiconductor fabrication processes in response to the fabrication control information. The fabrication condition recipe may include fabrication variables (e.g., temperature, pressure, and time), specification data, actual fabrication data (e.g., fabrication data having the lowest error rate), etc. for each piece of semiconductor fabrication equipment 130a~130n.

Referring to FIG. 1, the equipment server A 120a manages a first semiconductor fabrication equipment 130a and a second semiconductor fabrication equipment 130b, and the equipment server B 120b manages a third semiconductor fabrication equipment 130c and a fourth semiconductor fabrication equipment 130d. Accordingly, the equipment server A 120a stores information including a fabrication order, a fabrication progression environment, a fabrication condition recipe, etc. to control the first semiconductor fabrication equipment 130a and the second semiconductor fabrication equipment 130b. The equipment server B 120b stores information including a fabrication order, a fabrication progression environment, a fabrication condition recipe, etc. to control the third fabrication equipment 130c and the fourth fabrication equipment 130d.

The management server 140 stores a fail-over policy as well as information received from the equipment server group 120. The management server 140 communicates with the equipment server group 120 to determine whether or not there is a malfunction in the equipment server group 120 or whether or not there is a network failure. After that, the management server 140 performs a fail-over operation according to the fail-over policy when malfunction or a faulty operation occurs in at least one equipment server in the equipment server group 120.

Figure 3:
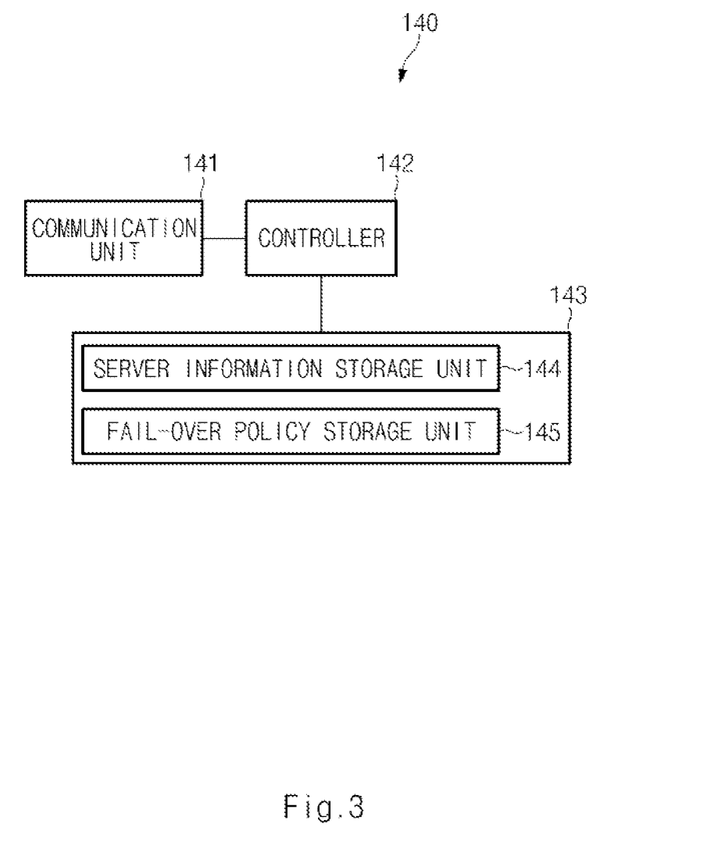
FIG. 3 is a detailed block diagram illustrating a management server shown in FIG. 1 according to an embodiment.

As shown in FIG. 3, the management server 140 includes a communication unit 141, a controller 142, and a storage unit 143.

In an embodiment, the communication unit 141 performs data communication using a specific communication protocol, such as an SECS protocol, or a general communication protocol, such as a TCP/IP.

The controller 142 transmits a test signal to the equipment server group 120 at intervals of a predetermined time, and determines whether a response signal is received from the equipment server group 120. If it is determined that the response signal is not received at least a predetermined number of times, the controller 142 determines that a malfunction or a faulty operation has occurred in a corresponding equipment server. On the other hand, if it is determined that the response signal is not received a number of times less than the predetermined number of times, the controller 142 re-transmits the test signal to the corresponding equipment server and awaits reception of the response signal.

In addition, if the number of equipment servers in which a malfunction or a faulty operation occurs, i.e., the number of faulty equipment servers, is equal to or greater than a predetermined number, the controller 142 determines that a network failure has occurred. If the number of faulty equipment servers is less than the predetermined number, the controller 142 determines that a malfunction or a faulty operation has occurred only in the faulty equipment servers, and executes the fail-over policy for the faulty equipment servers.

The storage unit 143 includes a server information storage unit 144 and a fail-over policy storage unit 145. The server information storage unit 144 includes information received from the equipment server group 120. For example, information received from the equipment server group 120 may include information on categories and a number of applications running in the respective equipment servers 120a~120m, a CPU occupancy rate for each application process, etc. The fail-over policy storage unit 145 stores at least one fail-over policy, which includes not only information regarding a policy for selecting a normal equipment server as a back-up server when malfunction or a faulty operation occurs in any one of the equipment servers 120a~120m, but also information regarding a policy for allocating at least one application running in an erroneous equipment server to a normal equipment server to perform a backup operation. The above-mentioned fail-over policy will be described in detail later with reference to FIG. 7.

Referring back to FIG. 1, the production execution system 111 calculates production execution statistical data using data received from the equipment server group 120. The equipment efficiency management system 112 manages the efficiency of the semiconductor fabrication equipment group 130 using data received from the equipment server group 120. The productivity management system 113 manages productivity or yield of semiconductor devices that are fabricated, using data received from the equipment server group 120.

For these purposes, the equipment servers 120a~120m periodically transmit communication data, which includes information about communication with the semiconductor fabrication equipment 130a~130n, to the production execution system 111, the equipment efficiency management system 112, and the productivity management system 113. The data periodically transmitted from the equipment servers 120a~120m may also be supplied to the management server 140.

Figure 4:
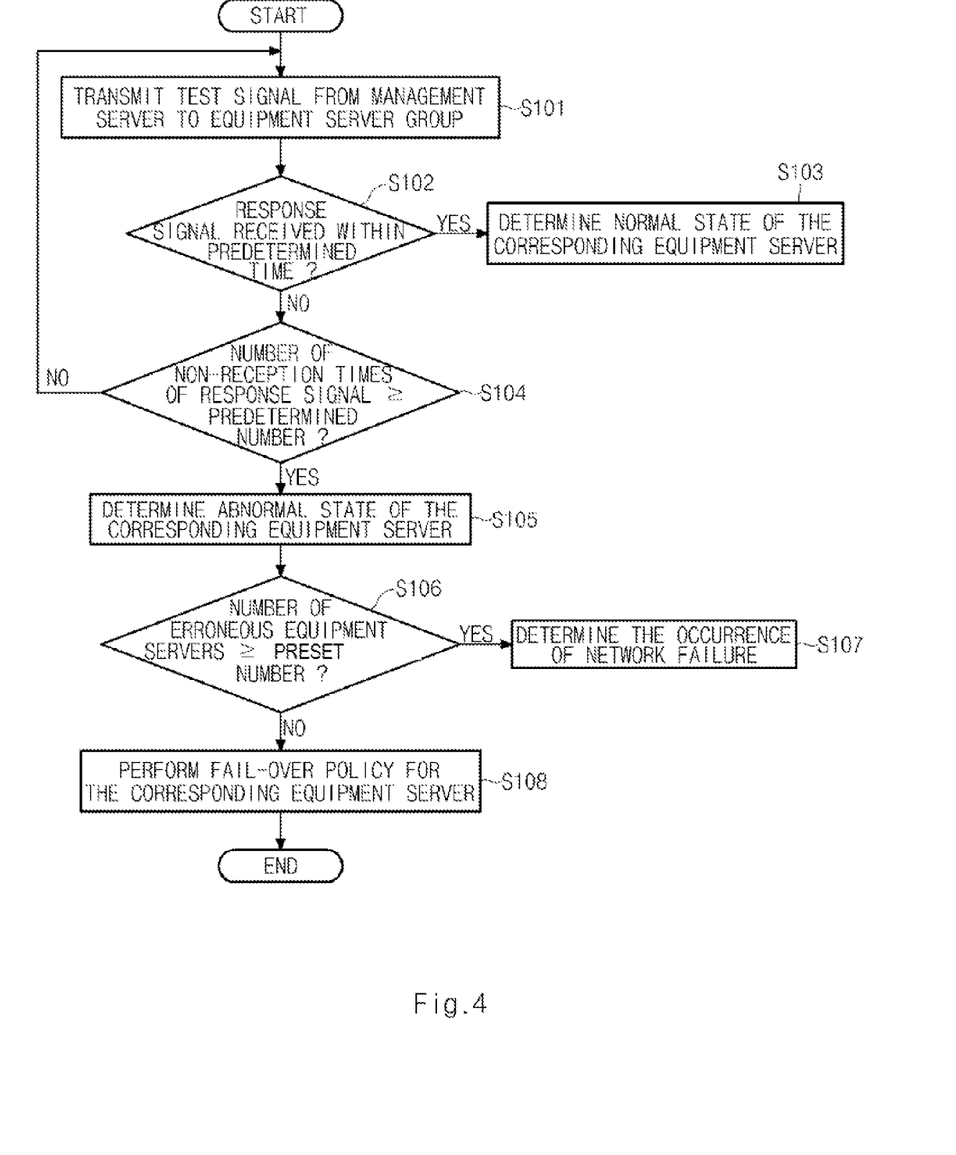
FIG. 4 is a flowchart illustrating a fail-over method for a semiconductor equipment server according to an embodiment.

FIG. 4 is a flowchart illustrating a fail-over method for a semiconductor equipment server according to an embodiment. For convenience of illustration, the fail-over method will hereinafter be described with reference to FIGS. 1 to 4. The semiconductor fabrication equipment group 130 performs fabrication processes by applying a predetermined fabrication environment, a fabrication condition, and a fabrication recipe to the lot 150 under the control of the equipment server group 120. The management server 140 periodically communicates with the equipment server group 120, collects information such as categories of respective applications, and a CPU occupancy rate of each application from each equipment server in the equipment server group 120, and stores the collected information in the server information storage unit 144.

As described above, the management server 140 periodically communicates with the equipment server group 120, and periodically transmits a test signal to the equipment server group 120 in step S101. In response to the test signal, the equipment server group 120 operating in a normal mode transmits a response signal (e.g., a live signal) to the management server 140.

Accordingly, the management server 140 can determine whether the response signal is received from the equipment server group 120 within a predetermined time in step S102. If the management server 140 receives the response signal within the predetermined time at S102, the management server 140 determines that the corresponding equipment server is operating normally in step S103.

On the other hand, if the management server 140 does not receive the response signal from the corresponding equipment server, the management server 140 re-transmits the test signal to the corresponding equipment server and awaits reception of the response signal. The management server 140 counts the number of times of non-reception of the response signal from the corresponding equipment server, and determines whether the number of non-reception times is equal to or greater than a predetermined number in step S104.

If the number of non-reception times is determined to be less than the predetermined number in step S104, the steps S101~S104 are repeatedly performed. On the other hand, if the number of time of non-reception is determined to be equal to or greater than the predetermined number in step S104, the management server 140 determines the corresponding equipment server to be a faulty equipment server in which a malfunction or a faulty operation occurs in step S105.

Thereafter, the management server 140 determines whether the number of faulty equipment servers is equal to or greater than a preset number in step S106.

If it is determined that the number of faulty equipment servers is equal to or greater than the preset number in step S106, the management server 140 determines that a network failure has occurred in step S107. When it is determined that a network failure has occurred, the management server 140 does not execute the fail-over policy.

On the other hand, if it is determined that the number of erroneous equipment servers is less than the preset number in step S106, the management server 140 determines that malfunction or a faulty operation has occurred only in the corresponding equipment server, and executes the fail-over policy for the corresponding equipment server in step S108.

A step for determining whether or not the network failure has occurred according to an embodiment will hereinafter be described in detail with reference to FIGS. 5 and 7a~7c.

Figure 5:
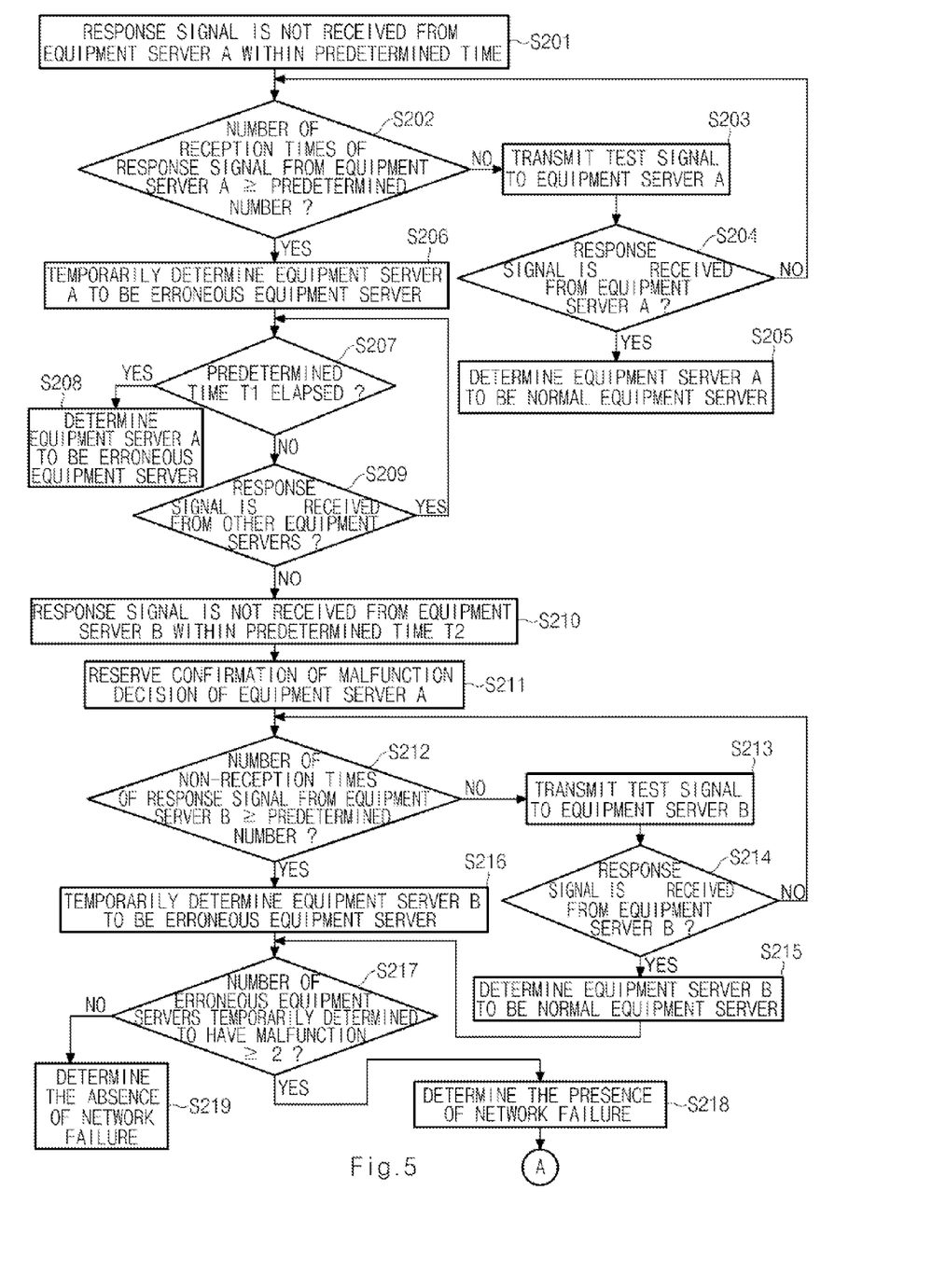
FIG. 5 is a flowchart illustrating a method for determining whether a network failure occurs according to an embodiment.

Referring to FIG. 5, if a response signal is not received from an equipment server A within a predetermined time in step S201, the management server 140 determines whether the response signal is not received from the equipment server A at least a predetermined number of times in step S202 in the same manner as in the step S104 of FIG. 4. If it is determined that the response signal is not received from the equipment server A a number of times less than the predetermined number of times in step S202, the management server 140 re-transmits a test signal to the equipment server A in step S203. Thereafter, the management server 140 determines whether the response signal is received from the equipment server A within a predetermined time in step S204. Upon receiving the response signal from the equipment server A, the management server 140 determines that the equipment server A operates normally in step S205. On the other hand, if the response signal is not received from the equipment server A, the management server 140 repeatedly performs the above-mentioned steps S202 to S204.

Meanwhile, if it is determined that the response signal is not received from the equipment server A at least the predetermined number of times in step S202, the management server 140 temporarily determines that malfunction or a faulty operation has occurred in the equipment server A in step S206.

Figure 7A:
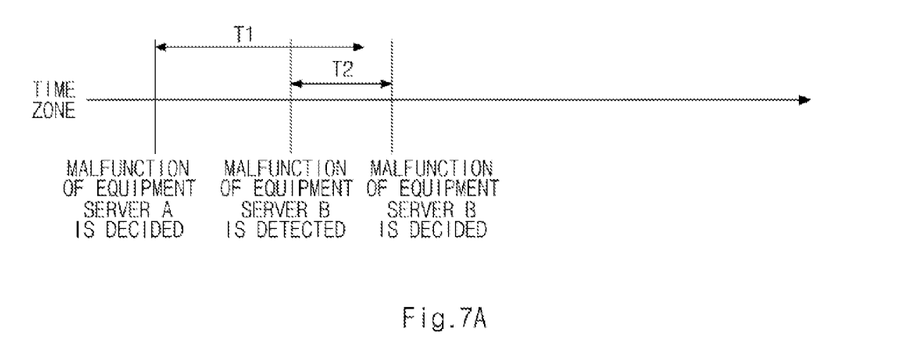
FIGS. 7a to 7c are conceptual diagrams illustrating network failure decision according to an embodiment.

After the management server 140 temporarily determines that the malfunction or faulty operation has occurred in the equipment server A in step S206, the management server 140 determines whether a predetermined time T1 has elapsed, as shown in FIG. 7a, in step S207. If no malfunction of other equipment servers is detected after the predetermined time T1 passes, the management server 140 finally determines that the malfunction or faulty operation has occurred in the equipment server A and the equipment server A is determined to be a faulty equipment server in step S208.

If it is determined that the predetermined time T1 has not elapsed in step S207, the management server 140 determines whether a response signal is received from another equipment server, e.g., the equipment server B, within a predetermined time T2 in step S209.

If it is determined that the response signal is received from another equipment server, e.g., the equipment server B, in step S209, the step S207 is repeatedly performed. On the other hand, if it is determined that the response signal is not received from another equipment server, e.g., the equipment server B, in step S210, the management server 140 reserves confirmation of the equipment server A as a faulty equipment server in step S211.

After that, the management server 140 determines whether the number of times of non-reception of the response signal from the equipment server B is equal to or greater than a predetermined number in step S212. If it is determined that the number of times of non-reception of the response signal from the equipment server B is less than the predetermined number in step S212, the management server 140 re-transmits the test signal to the equipment server B in step S213.

Subsequently, the management server 140 determines whether the response signal is received from the equipment server B within a predetermined time in step S214. If it is determined that the response signal is not received from the equipment server B within the predetermined time in step S214, the above-mentioned step S212 is repeatedly performed.

On the other hand, if it is determined that the response signal is received from the equipment server B within the predetermined time in step S214, the management server 140 determines that the equipment server B is in a normal mode in step S215.

In step S212, if it is determined that the number of times of non-reception of the response signal from the equipment server B is equal to or greater than the predetermined number, the management server 140 temporarily determines the equipment server B is a faulty equipment server in step S216.

In step S217, the management server 140 determines whether the number of faulty equipment servers that are temporarily determined is equal to or greater than a preset number, e.g., 2. If the number of faulty equipment servers is determined to be 2 or more in step S217, the management server 140 determines that a network failure has occurred in step S218. On the other hand, if the number of faulty equipment servers is determined to be less than the preset number, e.g., 1, the management server 140 determines that the network failure has not occurred in step S219. The number of faulty equipment servers for determining the existence of the network failure is not limited to 2, and may be changed to another number depending on a user's intention.

Figure 6:
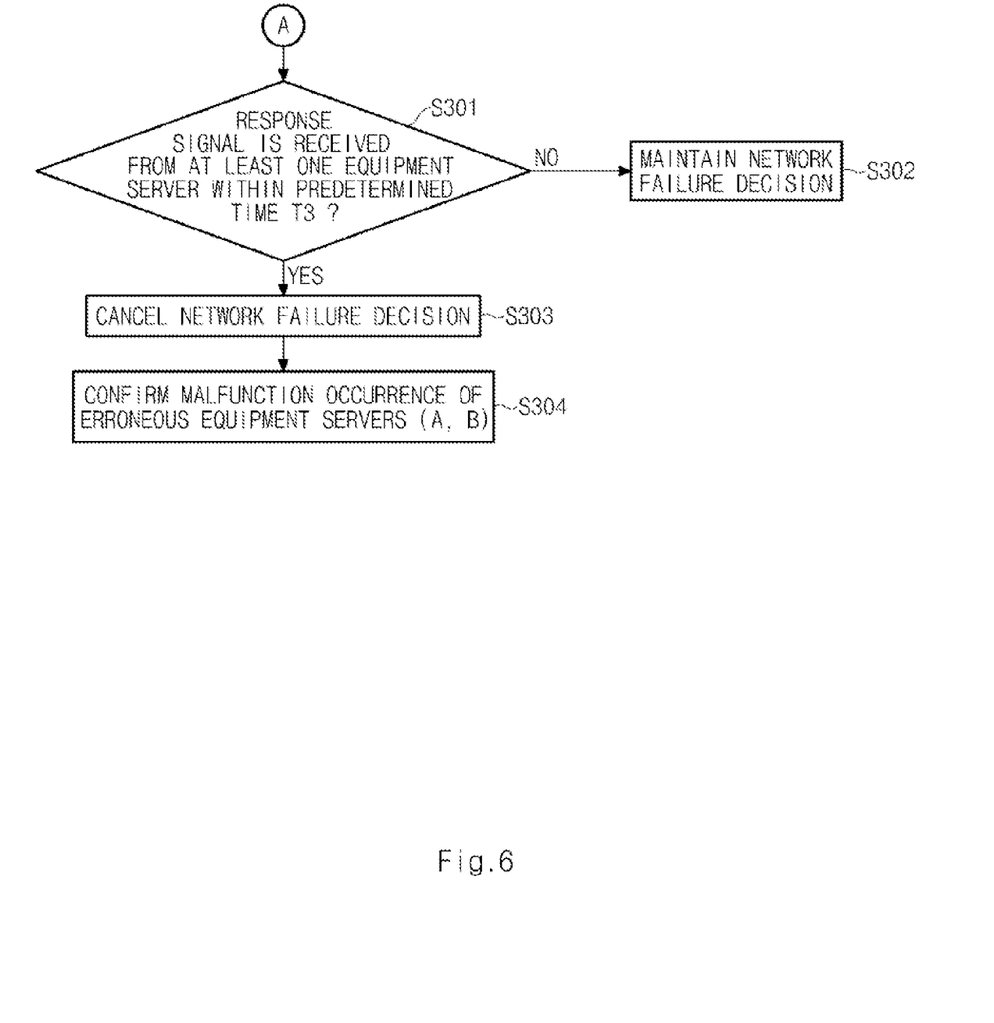
FIG. 6 is a flowchart illustrating a method for cancelling a network failure decision after determining the occurrence of the network failure according to an embodiment.

A method for cancelling a network failure decision after completing the network failure determination in the step S218 will hereinafter be described with reference to FIG. 6.

Figure 7B:
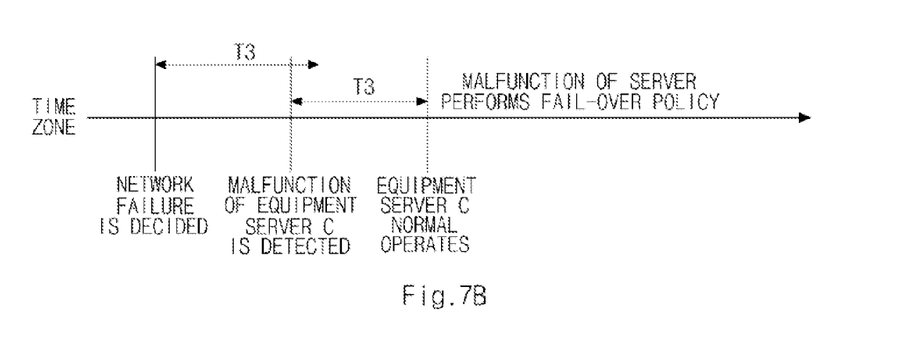

After completing the network failure decision in step S218, the management server 140 determines whether a response signal is received from at least one equipment server within a predetermined time T3 in step S301, as shown in FIG. 7*b*.

If it is determined that the response signal is not received from at least one equipment server within the predetermined time T3 in step S301, the management server 140 maintains the network failure decision in step S302. On the other hand, if it is determined that the response signal is received from at least one equipment server (server C) within the predetermined time T3 in step S301, the management server 140 cancels the network failure decision in step S303. After that, in step S304, the management server 140 confirms that the malfunction or faulty operation occurs only in the equipment server A or B, which is temporarily determined as a faulty equipment server.

Figure 7C:
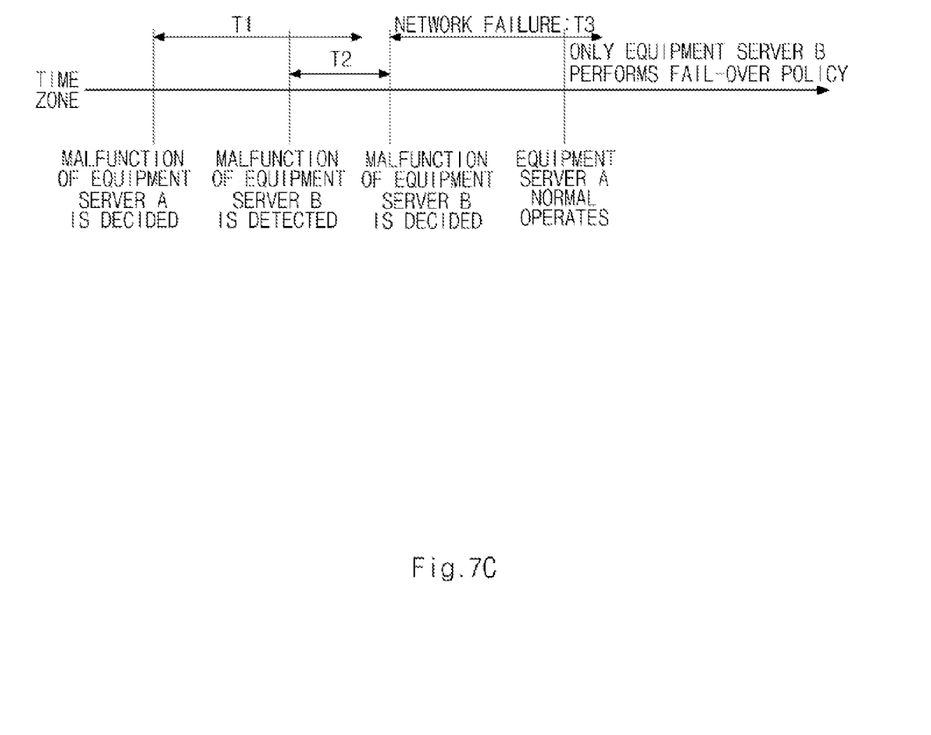

Referring to FIG. 7*c*, assuming that at least one equipment server from which the response signal is received within the predetermined time T3 is determined to be the equipment server A in step S301, the management server 140 cancels the decision that the malfunction or faulty operation occurs in the equipment server A, and confirms that the malfunction or faulty operation occurs in the equipment server B. Accordingly, the management server 140 executes the fail-over policy only for the equipment server B.

Implementation of a fail-over policy according to an embodiment will be described hereinafter.

If at least one equipment server, e.g., 120*m*-1 and 120*m*, from among the equipment server group 120 is determined as a dedicated backup server for a backup operation and a malfunction or a faulty operation has occurred in at least one equipment server from among operating equipment servers, e.g., 120*a*~120*m*-2, an application running in a faulty equipment server is allocated to the equipment server 120*m*-1 and 120*m* serving as the dedicated backup server. However, if the dedicated backup server is included in the semiconductor equipment system 100, the dedicated backup server may not operate in a normal mode, and may operate only in the abnormal mode in which the malfunction or network failure has occurred. As a result, the dedicated backup server is vulnerable to the efficiency of costs and size (or region).

In contrast, assuming that a malfunction or a faulty operation occurs in at least one equipment server from among the operating equipment servers 120*a*~120*m* under the condition that all the equipment servers 120*a*~120*m* of the equipment server group 120 are operating, the management server 140 may recognize the number of applications running in a faulty equipment server and information regarding a CPU occupancy rate of each application. Thereafter, the applications running in the faulty equipment server are allocated to equipment servers that are operating normally, i.e., in a normal mode, according to a CPU occupancy rate of each of the normal equipment servers. In addition, and the applications are backed up in the normal equipment servers.

For example, if a malfunction or a faulty operation occurs in the equipment server A while multiple equipment servers A~F are in operation, the management server 140 may recognize application information of the equipment server A.

Figure 8:
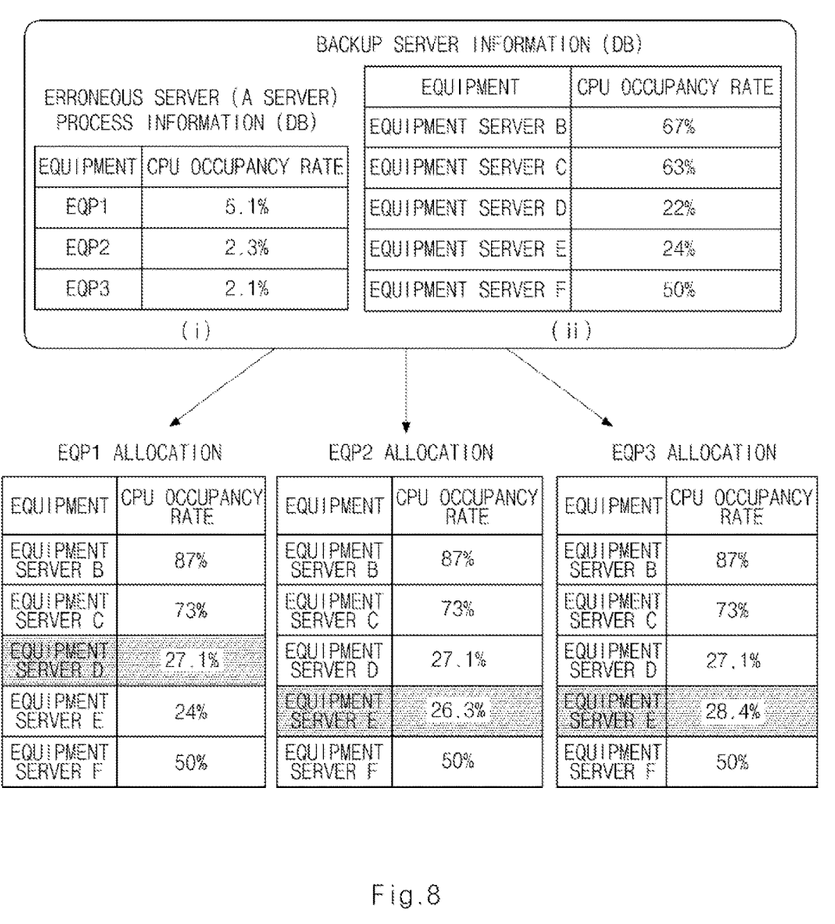
FIG. 8 is a conceptual diagram illustrating a backup operation for a faulty equipment server.

Referring to FIG. 8(*i*), three applications EQP1, EQP2, and EQP3 run in the equipment server A. A CPU occupancy rate of the application EQP1 is denoted by 5.1%, a CPU occupancy rate of the application EQP2 is denoted by 2.3%, and a CPU occupancy rate of the application EQP3 is denoted by 2.1%.

Referring to FIG. 8(*ii*), CPU occupancy rates of the equipment servers B~F operating in a normal mode are as follows: a CPU occupancy rate of the equipment server B is denoted by 67%; a CPU occupancy rate of the equipment server C is denoted by 63%; a CPU occupancy rate of the equipment server D is denoted by 22%; a CPU occupancy rate of the equipment server E is denoted by 24%; and a CPU occupancy rate of the equipment server F is denoted by 50%.

Accordingly, the application EQP1 having the highest CPU occupancy rate of 5.1% from among the application EQP1, EQP2, and EQP3 of the equipment server A is allocated to the equipment server D having the lowest CPU occupancy rate, such that the CPU occupancy of the equipment server D is changed from 22% to 27%. As a result, the equipment server having the lowest CPU occupancy rate is determined to be the equipment server E having the CPU occupancy rate of 24%.

Subsequently, the application EQP2 having the second-highest CPU occupancy rate of 2.3% in the equipment server A is allocated to the equipment server E having the lowest CPU occupancy rate from among the equipment servers B, C, D, E, and F. As a result, the CPU occupancy rate of the equipment server E is denoted by 26.3%, and the equipment server having the lowest CPU occupancy rate is determined to be the equipment server E having the CPU occupancy rate of 26.3%.

The application EQP3 having the lowest CPU occupancy rate of 2.1% in the equipment server A is allocated to the equipment server E having the lowest CPU occupancy rate, such that the CPU occupancy rate of the equipment server E is denoted by 28.4%.

As is apparent from the above description, the fail-over system and method for the semiconductor equipment server can automatically and immediately recognize a malfunction or a faulty operation occurring in an equipment server that is configured to manage a semiconductor fabrication equipment, and perform a backup operation so as to prevent the semiconductor fabrication equipment from stopping operations. As a result, the productivity of the semiconductor device is improved.

Those skilled in the art will appreciate that embodiments may be carried out in other specific ways than those set forth herein without departing from the spirit and essential characteristics of the present invention. The above embodiments are therefore to be construed in all aspects as illustrative and not restrictive. Embodiments should be determined by the appended claims and their legal equivalents, not by the above description, and all changes coming within the meaning and equivalency range of the appended claims are intended to be embraced therein. Also, claims that are not explicitly cited in each other in the appended claims may be presented in combination as an embodiment or included as a new claim by a subsequent amendment after the application is filed.

The above embodiments of the present invention are illustrative and not limitative. Various alternatives and equivalents are possible. The invention is not limited by the type of deposition, etching polishing, and patterning steps described herein. Nor is the invention limited to any specific type of semiconductor device. For example, the present invention may be implemented in a dynamic random access memory (DRAM) device or non volatile memory device. Other additions, subtractions, or modifications are obvious in view of the present disclosure and are intended to fall within the scope of the appended claims.

What is claimed is:

1. A fail-over system for a semiconductor equipment server, the system comprising:
 a semiconductor fabrication equipment group including a plurality of semiconductor fabrication equipment;
 an equipment server group including a plurality of equipment servers and configured to control an operation of the semiconductor fabrication equipment group; and
 a management server configured to detect an error or a faulty operation in at least one equipment server in the equipment server group by communicating with the equipment server group, and execute a fail-over policy for a faulty equipment server in which the faulty operation is detected,
 wherein executing the fail-over policy includes allocating at least one application running in the faulty equipment server to at least one normal equipment server in which no faulty operation is detected in the equipment server group,
 wherein, when the number of equipment servers, which are in the error or faulty operation, is greater than or equal to a predetermined number, the management server determines that a network failure has occurred and does not execute the fail-over policy, the predetermined number being greater than 1 and smaller than a total number of the equipment servers in the equipment server group,
 wherein, if the management sever receives a response signal from at least one equipment server in a predetermined period of time after determining the network failure has occurred, the management server cancels the decision of the network failure, and
 wherein, if the management sever receives no response signal from at least one equipment server in the predetermined period of time after determining the network failure has occurred, the management server maintains the decision of the network failure.

2. The fail-over system according to claim 1, wherein the equipment servers are coupled to a respective one of the plurality of semiconductor fabrication equipment on a one to one basis, or more than two semiconductor fabrication equipment are coupled to a single equipment server.

3. The fail-over system according to claim 1, wherein each of the equipment servers includes:
 a communication unit configured to communicate with the management server or the semiconductor fabrication equipment group;
 a controller configured to control operations of the semiconductor fabrication equipment group; and
 a storage unit configured to store fabrication control information for the semiconductor fabrication equipment group.

4. The fail-over system according to claim 1, wherein the management server includes:
 a communication unit configured to communicate with the equipment server group;
 a controller configured to transmit a test signal to the equipment server group at intervals of a predetermined time, determine whether a response signal is received from the equipment server group within the predetermined period of time to determine whether an error or a faulty operation has occurred in the equipment server group, and execute the fail-over policy for the erroneous equipment server in the equipment server group; and
 a storage unit configured to store information received from the equipment server group and the fail-over policy.

5. The fail-over system according to claim 4, wherein the controller determines the occurrence of the network failure when no response signal is received from at least the predetermined number of the equipment servers in the equipment server group within a preset period of time.

6. The fail-over system according to claim 4, wherein:
 if no response signal is received from a first equipment server in the equipment server group within the predetermined period of time, the controller reserves confirmation of a malfunction decision of the first equipment server, determines whether an error or a faulty operation has occurred in other equipment servers in the equipment server group within a first period of time, determines the network failure has occurred when no response signal is received from a second equipment server in the equipment server group within the predetermined period of time, and executes the fail-over policy for the first equipment server when an error or a faulty operation is not detected from another equipment server in the equipment server group within a second period of time.

7. The fail-over system according to claim 6, wherein: after determining the network failure has occurred, if the controller receives a response signal from at least one equipment server in the equipment server group within a third period of time, the controller cancels the decision of the network failure.

8. The fail-over system according to claim 4, wherein the information received from the equipment server group includes at least one of category information of each of applications running in each equipment server of the equipment server group, information regarding the number of the applications, and Central Processing Unit (CPU) occupancy rate information for each of the applications.

9. The fail-over system according to claim 4, wherein the fail-over policy includes a policy for selecting a normal equipment server to back up an erroneous equipment server when an error or a faulty operation occurs in at least one equipment server in the equipment server group and a policy for allocating at least one application running in the erroneous equipment server to the normal equipment server and performing a backup operation for the allocated application.

10. The fail-over system according to claim 4, wherein the controller analyzes Central Processing Unit (CPU) occupancy rates of applications running in a faulty equipment server in the equipment server group, analyzes CPU occupancy rates of normal equipment servers in the equipment server group, and performs a backup operation for each of the applications of the faulty equipment server in an ascending numerical order of the CPU occupancy rates of the normal equipment servers.

11. The fail-over system according to claim 10, wherein an application having the highest CPU occupancy rate from among the applications of the faulty equipment server is allocated to an equipment server having the lowest CPU occupancy rate from among the normal equipment servers.

12. The fail-over system according to claim 11, wherein an application having the second-highest CPU occupancy rate from among the applications of the faulty equipment server is allocated to an equipment server, which has the lowest CPU occupancy rate that is determined after backing up the application having the highest CPU occupancy rate, from among the normal equipment servers.

13. The fail-over system according to claim 4, wherein the communication unit performs data communication using a SEMI Equipment Communication Standard (SECS) protocol or a Transmission Control Protocol/Internet Protocol (TCP/IP).

14. A fail-over method for a semiconductor equipment server, the method comprising:
determining whether an error or a faulty operation has occurred in an equipment server group configured to control semiconductor fabrication processes of a semiconductor fabrication equipment group; and
if a faulty equipment server in which the error or faulty operation has occurred is present in the equipment server group, executing a fail-over policy,
wherein executing the fail-over policy includes allocating at least one application running in the faulty equipment server to at least one normal equipment server in which no error or faulty operation occurs in the equipment server group,
wherein, when the number of equipment servers, which are in the error or faulty operation, is greater than or equal to a predetermined number, the method includes determining that a network failure has occurred and executing no fail-over policy, the predetermined number being greater than 1 and smaller than a total number of the equipment servers in the equipment server group,
wherein, if a response signal is received from at least one equipment server in a predetermined period of time after determining the network failure has occurred, the method includes cancelling the decision of the network failure, and
wherein, if no response signal is received from at least one equipment server in the predetermined period of time after determining the network failure has occurred, the method includes maintaining the decision of the network failure.

15. The fail-over method according to claim 14, wherein the determining includes:
transmitting a test signal to the equipment server group;
determining whether a response signal is received from the equipment server group within a first period of time; and
determining an equipment server transmitting no response signal as the faulty equipment server.

16. The fail-over method according to claim 15, further comprising:
if at least a predetermined number of equipment servers from among a plurality of equipment servers in the equipment server group transmit no response signal within a second period of time, determining the network failure has occurred.

17. The fail-over method according to claim 16, further comprising:
if a response signal from the equipment server group is received within a third period of time after determining the network failure has occurred, cancelling the decision of the network failure.

18. The fail-over method according to claim 14, wherein executing the fail-over policy further includes:
analyzing a Central Processing Unit (CPU) occupancy rate for each application running in the faulty equipment server;
analyzing a CPU occupancy rate of each of normal equipment servers in the equipment server group; and
performing a backup operation for each application of the faulty equipment server in an ascending numerical order of the CPU occupancy rates of the normal equipment servers.

19. The fail-over method according to claim 18, wherein performing the backup operation for each application includes:
backing up an application having the highest CPU occupancy rate from among applications of the faulty equipment server onto an equipment server having the lowest CPU occupancy rate from among the normal equipment servers.

20. The fail-over method according to claim 19, wherein performing the backup operation for each application process includes:
backing up an application having the second-highest CPU occupancy rate from among the applications of the faulty equipment server onto an equipment server, which has the lowest CPU occupancy rate that is determined after backing up the application having the highest CPU occupancy rate, from among the normal equipment servers.

* * * * *